UNITED STATES PATENT OFFICE.

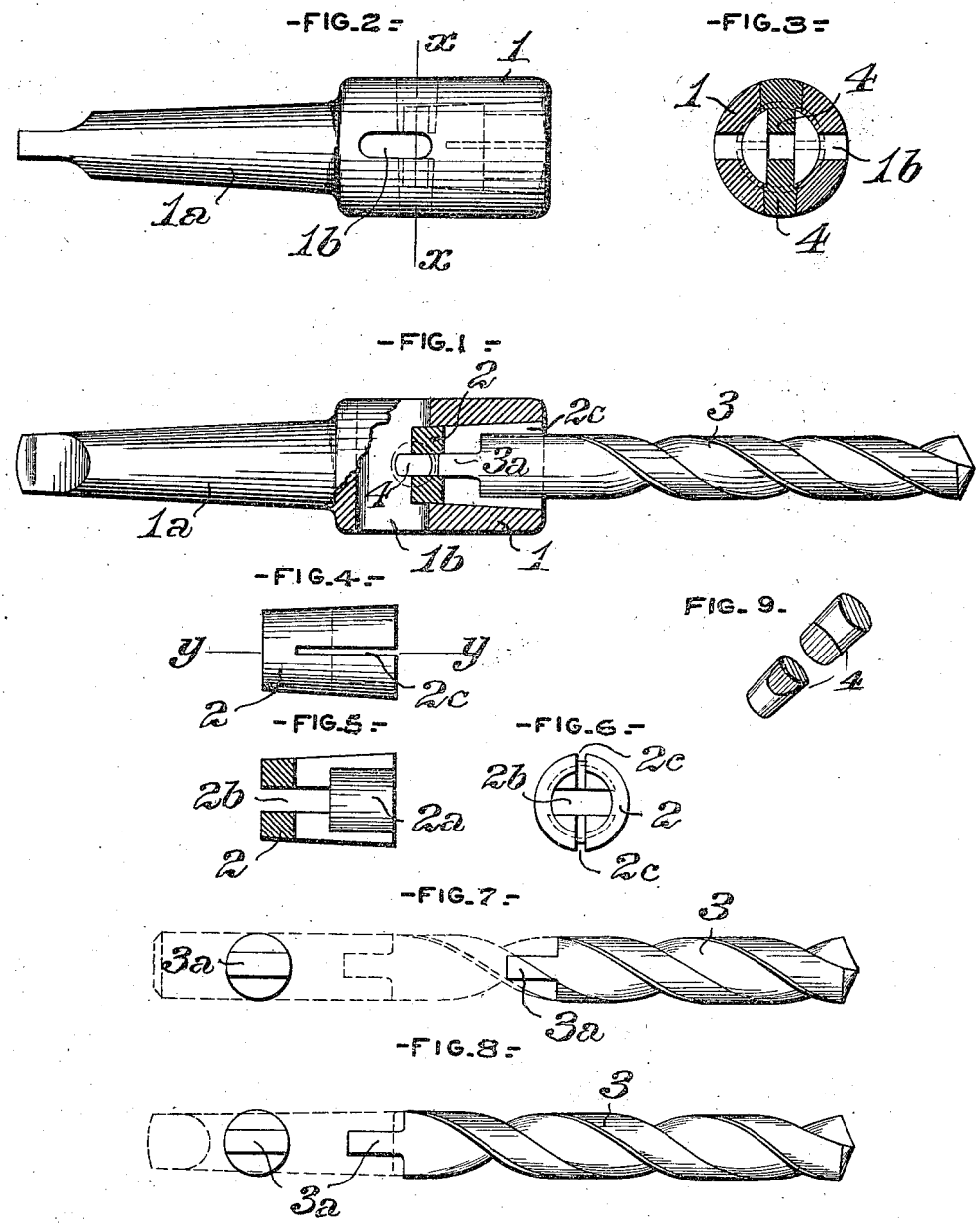

FRANK E. BOCORSELSKI, OF RICHMOND, VIRGINIA.

DRILL-SOCKET.

1,278,428.  Specification of Letters Patent.  Patented Sept. 10, 1918.

Application filed November 22, 1917. Serial No. 203,330.

*To all whom it may concern:*

Be it known that I, FRANK E. BOCORSELSKI, of Richmond, in the county of Henrico and State of Virginia, have invented a certain new and useful Improvement in Drill-Sockets, of which improvements the following is a specification.

My invention relates to appliances for centering, holding, and driving, drills or other cutting tools, and its object is to provide a simple and inexpensive device for positively driving straight shank cutting tools, which will enable broken drills of every description to be utilized without waste, thereby effecting great economy in the cost of high speed tool steel.

The improvement claimed is hereinafter fully set forth.

In the accompanying drawings: Figure 1 is a view, partly in elevation and partly in longitudinal central section, of a drill socket and inserted drill, illustrating an application of my invention; Fig. 2, a side view, in elevation, of the socket member proper; Fig. 3, a transverse section through the same, on the line $x$ $x$ of Fig. 2; Fig. 4, a side view, in elevation, of the collet; Fig. 5, an axial section through the same, on the line $y$ $y$ of Fig. 4; Fig. 6, an end view, as seen from the right; Fig. 7, side and end views of a cylindrical shank drill which has been broken and fitted for use in my improved socket, Fig. 8, similar views of a taper shank drill, and Fig. 9 is a perspective view of the driving pin.

In the practice of my invention, referring descriptively to the specific embodiment thereof which is herein exemplified, I provide a cylindrical socket member, 1, having a shank, $1^a$, on one of its ends, adapted to be fitted into the spindle of the machine by which it is rotated, and being bored out conically for the major portion of its length, to receive a correspondingly turned driving bushing or collet, 2. A transverse drift slot, $1^b$, is formed in the socket, said slot extending slightly over the inner end of the conical bore of the socket, and therefrom toward the shank end thereof. The collet, 2, has a cylindrical bore, $2^a$, extending inwardly from its larger end for a portion of its length, and a rectangular transverse slot, $2^b$, extending from the inner end of its bore through the remainder of its length. It is also rendered contractible by having narrow longitudinal slots, $2^c$, formed in its body, for the major portion of its length, at a right angle to the slot, $2^b$.

The cutting tool, 3, which is to be carried and driven by the socket, and which, in this instance, is shown as a twist drill, is turned, adjacent to one of its ends, to fit in the cylindrical bore of the collet, and a flat tang, $3^a$, is formed upon it, extending from the cylindrically turned portion to the adjacent end. The tang, $3^a$, fits neatly in the transverse slot, $2^b$, of the collet.

Rotation is positively imparted to the collet, 2, and inserted cutting tool, 3, from the socket member, 1, by a driving pin, 4, which is fixedly transversely in the socket, and is preferably, as shown, of conical or tapered form. The portions of the pin which project into the longitudinal slot, $2^b$, of the collet, are flattened to fit said slot, as shown in Fig. 1, and, by their engagement therewith, the positive rotation of the collet is insured. The middle portion of the driving pin is cut away, after it has been fixed in the socket, as shown in Fig. 3, in order to enable a drift, which is inserted in the slot, $1^b$, to be pressed against the inner end of the collet, when it is desired to remove the latter from the socket.

In the operation of a socket embodying my invention, the collet is accurately centered by the fit of its conically turned body in the similar bore of the socket member, and is locked therein by the pressure of the inserted tool on the work, which acts to clamp it in the bore of the socket member, and on the tool, with force proportionate to the extent or increase of such pressure. The tool is held firmly in the collet by the engagement of its tang with the longitudinal slot thereof, and, with the collet, is positively rotated by the engagement of the driving pin with said slot.

The practical advantages of my invention will be obvious to those skilled in machine shop operation, in the particulars of the simplicity and inexpensiveness of the appliance; its capability of use on the spindles of various kinds of machines for providing a positive driving mechanism which practically forms part of the machine; and the great economy which is effected in its application, by rendering straight shank drills available at a much lower cost, and by utilizing broken drills of every description, which, in view of the cost of high speed steel, effects a saving, which, in large shops, will amount to thousands of dollars per year.

I claim as my invention and desire to secure by Letters Patent:—

1. In a drill socket, the combination of a socket member having a shank at one end, a concentric bore at its opposite end, and a transverse drift slot adjoining its bore; a contractible collet fitting in the socket member and having a concentric bore extending through a portion of its length and a longitudinal central slot for the remainder of its length; and a driving pin fixed in the socket member and engaging the slot of the collet, said pin being longitudinally divided to permit a drift inserted through the drift slot to have full transverse bearing on the inner end of the collet.

2. A drill socket comprising a head and tapered shank, said head having a conical bore in its front end and a transverse drift slot intersecting said bore near its small end, a contractible collet fitting said bore and having a transverse slot in its rear end, a tapered driving pin extending through said head and having its sides flattened to engage in said slot in said collet, and a drift pin adapted to be inserted in said drift slot, said driving pin being centrally cut away to permit the passage of said drift pin.

FRANK E. BOCORSELSKI.

Witnesses:
PAUL P. FITZPATRICK,
A. W. HIGH.